(12) United States Patent
Moore et al.

(10) Patent No.: US 11,971,347 B2
(45) Date of Patent: *Apr. 30, 2024

(54) SEAMLESS INTEGRATING CAVITY OF MONOLITHIC FUMED SILICA

(71) Applicant: Southwest Research Institute, San Antonio, TX (US)

(72) Inventors: Thomas Moore, San Antonio, TX (US); Kurt D. Retherford, San Antonio, TX (US); Charity Phillips-Lander, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/734,830

(22) Filed: May 2, 2022

(65) Prior Publication Data
US 2023/0236114 A1 Jul. 27, 2023

Related U.S. Application Data

(62) Division of application No. 17/245,987, filed on Apr. 30, 2021, now Pat. No. 11,346,771.

(51) Int. Cl.
*G01N 21/31* (2006.01)
*G01N 21/85* (2006.01)

(52) U.S. Cl.
CPC .............. *G01N 21/31* (2013.01); *G01N 21/85* (2013.01); *G01N 2201/0612* (2013.01); *G01N 2201/0636* (2013.01); *G01N 2201/08* (2013.01)

(58) Field of Classification Search
CPC ............... G01N 21/31; G01N 21/85; G01N 2201/0612; G01N 2201/0636; G01N 2201/08; G01N 2021/8578; G01N 2021/8592; G01N 21/05; G01N 2201/065; G01N 2201/0806
USPC ........................................................ 356/326
See application file for complete search history.

(56) References Cited

U.S. PATENT DOCUMENTS

| | | | |
|---|---|---|---|
| 4,912,072 A | 3/1990 | Mallouk | |
| 7,868,287 B2 | 1/2011 | Fry | |
| 9,927,417 B2 | 3/2018 | Yakovlev | |
| 2010/0059528 A1* | 3/2010 | Zhevago | F17C 1/00 141/82 |

* cited by examiner

*Primary Examiner* — Md M Rahman
(74) *Attorney, Agent, or Firm* — Verrill Dana, LLP

(57) ABSTRACT

A seamless fumed silica monolithic integrating cavity device tailored to analyzing a flowed sample. The device is configured to facilitate optical measurements taken from a sample flowed through a cavity of the device. The cavity is defined by a fumed silica monolith with the added feature of a fused quartz lining on the surface of the monolith. This provides an intermediate surface that allows for cleaning and reuse of the highly effective diffuse light scattering fumed silica monolith. The lining may be placed under pressure or vacuum to structurally enhance mechanical integrity of the underlying monolith. Thus, continued or reliably repeated use of the device may be appreciated as well as use in more industrial environments that are prone to vibration. Additionally, while well suited for flow-based sample analysis, a valve of the cavity may be utilized for holding a sample in a temporarily static state for measurement.

9 Claims, 6 Drawing Sheets

SEAMLESS INTEGRATING CAVITY OF MONOLITHIC FUMED SILICA

BACKGROUND

Materials and items used in a variety of different applications are often evaluated for different character traits prior to use. Samples of different material types may be subjected to tests and evaluations to determine chemical properties, robustness, reflectiveness or any number of different optical and other behaviors. By way of a more specific example, a reflective coating or a light emitting diode (LED) light may be tested to determine optical characteristics prior to use, for example as a matter of quality control and rating. Of course, this and alternative sample types may be evaluated for absorption, scattering or a host of other optical characteristics as well.

When it comes to attaining optical measurements for a sample item, an integrating cavity is often utilized. An integrating cavity, sometimes referred to as an integrating sphere, is an optical apparatus that is defined by a diffuse reflecting material that is used to reflect light in all directions. That is, in contrast to using a mirror to reflect light in a particular direction, an integrating cavity utilizes a cavity of a known volume and dimensions that is defined by diffuse reflecting material configured to reflect light from the sample item in all directions, thereby uniformly distributing light within the cavity volume. Thus, more accurate optical characteristics of the sample item may be acquired. The advantage with such an apparatus is that the reflected light may only be lost due to absorption or exit through an opening, but is otherwise unaffected by scattering within the cavity. Optical radiance, spectral response, such as absorption and/or fluorescence, and optical energy may all be measured with a great deal of accuracy by employing an integrated cavity.

One factor in the degree of accuracy attainable by way of utilizing an integrated cavity is the architecture of the cavity device itself. For example, introducing a specimen sample into an integrated cavity may require that some type of hinged opening be utilized to open the housing of the cavity for placement of the sample within the cavity. This means that a seam will be present through the entire device. That is, not only is the outer housing body or structure opened, but the same is required of the internal reflective material and any other architecture at the seam. Thus, a seam through the entire device is present even after the sample is placed and the device closed. This seam provides a light path which may be minimized or mitigated to varying degrees. However, as a practical matter, the seam and light path are not entirely eliminated and some degree of light loss will be incurred that will ultimately impact the maximum accuracy attainable from the integrated cavity device.

Another factor in the degree of accuracy attainable by way of integrated cavity measurements is the amount of reflectiveness exhibited by the reflective material. Presently, state of the art integrating cavities may achieve a little over 99% reflectivity, with fairly small losses attributable to absorption. This is due to the availability of diffuse reflective materials such as specially tailored polytetrafluoroethylenes (PTFEs) and other fluoropolymers. For example, Spectralon® may exhibit a reflectivity of greater than about 99% in the visible range of between about 400 nm and about 700 nm, but with greater degrees of absorption outside of this range. These types of reflective materials may be considered Lambertian materials in that they exhibit an ideal matte or diffusely reflective behavior. A Lambertian material is one that may display a surface with isotropic luminance that approaches Lambert's cosine law of perfect diffusion (named after Johann Heinrich Lamber, who introduced the concept).

Of course, as with anything else, efforts to improve on the reflectivity available from current Lambertian materials, persist. To this end, fumed silica powder has been studied and employed as a Lambertian material, even within the context of integrating cavity applications. Fumed silica may be an improvement over other more conventional Lambertian materials in that it is known to display reflectivity of over 99.5% in the visible spectral range and even outside of this range, such as in the UV and near infrared spectral range.

Unfortunately, as a practical matter, utilizing fumed silica as a reflective for integrating cavity applications poses significant challenges. More specifically, the behavior of the fumed silica powder is one that is readily prone to degradation as water or other atmospheric contaminants are absorbed by the material during use. Fumed silica powder exhibit a large surface area and electrostatic properties such that dust, pollen, moisture and other contaminants are attracted to and readily absorbed by the powder. Once more, cleaning the contaminated surface of fumed silica with a conventional solvent or cleanser is not practical given that these cleaners are also prone to uptake by the fumed silica.

In theory, fumed silica may be formed into a block or monolithic body to serve as a reflective. That is, more than simply providing a thin coating for sake of reflectiveness, a substantial thickness of fumed silica powder may be used to serve as the Lambertian material for the integrating cavity. Thus, the reflective ability of the fumed silica may be enhanced. Of course, as with issues of contaminant uptake, the ability to utilize a fumed silica in monolithic form also presents a challenge. Namely, the fumed silica is naturally powder in form and may be structurally resistant to maintaining a durable monolithic form. Indeed, whether for this reason or due to contaminant issues, the ability to repeatedly utilize an integrating cavity that is reliant on fumed silica as a reflective remains largely impractical. At present, in spite of the notable improvement in reflectivity, integrating cavities that utilize fumed silica as the reflective have a useful life of no more than about two months. Therefore, integrating cavities lacking this enhanced degree of reflectivity but offering greater durability are still generally utilized in combination with an architecture that presents a seam subject to light path losses.

SUMMARY

A seamless integrating cavity device is disclosed. The device includes an outer housing to accommodate a light pipe and an inlet, each reaching into a cavity of the device for receiving light and a sample, respectively. The cavity is a central cavity defined by a liner of fused quartz. A diffusely reflective monolithic fumed silica is sandwiched between the outer housing and the liner of fused quartz and in air-tight sealing communication therewith. In one embodiment, the sample is fluidly received by the cavity with the device further including an outlet for flowing the sample out from the cavity.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

DETAILED DESCRIPTION

Embodiments are described with reference to a particular seamless integrated cavity utilizing fumed silica as a diffuse reflective material. Specifically, the embodiments depict a device or unit with a flow-through channel into and out of a housing. Thus, a sample for optical testing may be routed to and/or through a cavity of the device. However, other configurations of the device may be utilized. For example, there is no requirement that the sample be continuously flowed through the cavity. Rather, a valve may be closed for evaluation of the sample in a static state. Regardless, so long as the cavity is channelized or seamless and defined by a fumed silica monolith with a substantially transparent liner, appreciable benefit may be realized.

Figure 1:
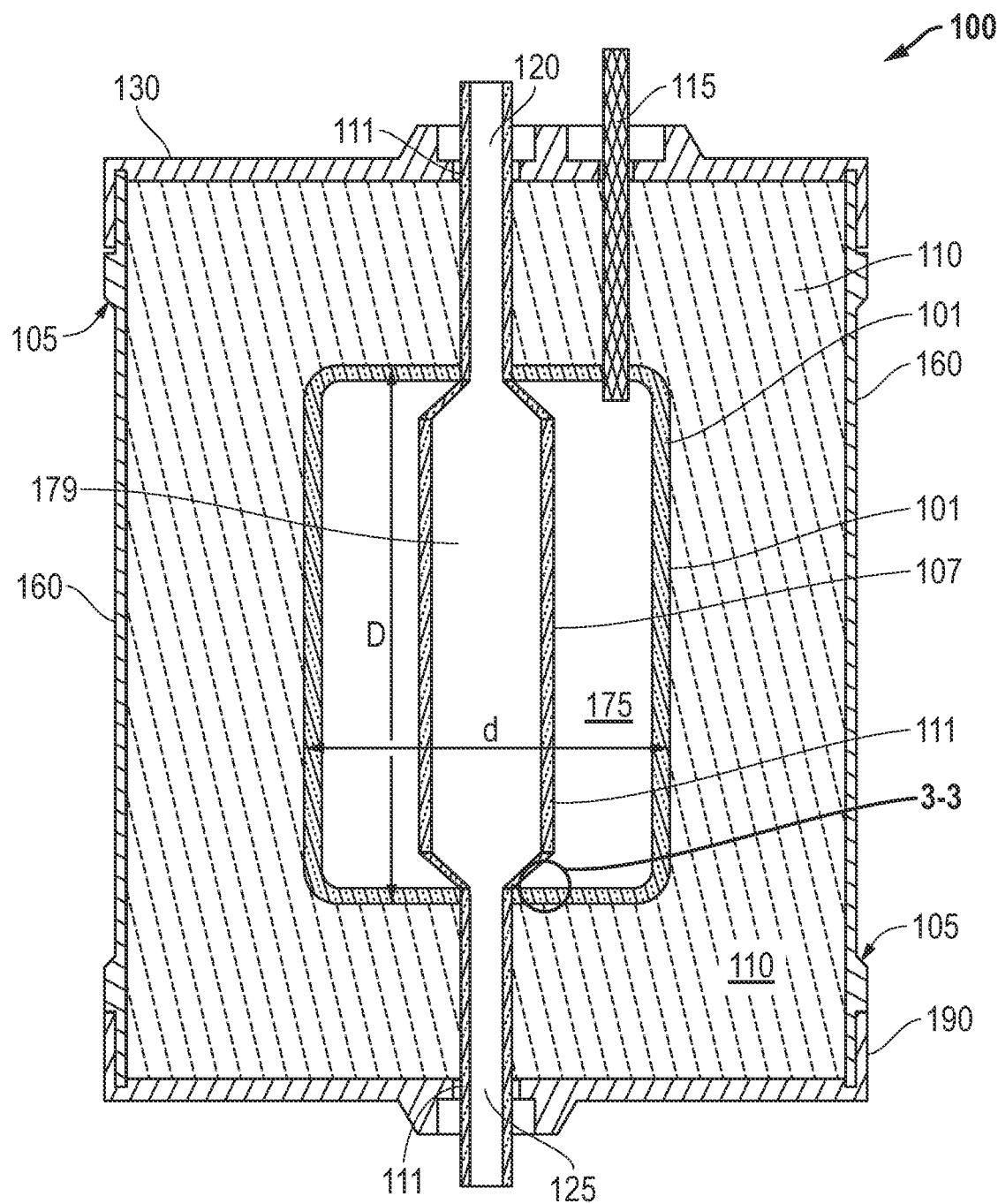
FIG. 1 is a side cross-sectional view of an embodiment of a seamless fumed silica integrating cavity device.

Referring now to FIG. 1, a side cross-sectional view of an embodiment of a seamless fumed silica integrating cavity 100 is depicted. As suggested, this device 100 is largely comprised of a fumed silica 110 to serve as a diffuse reflective about a cavity 175. However, in other embodiments, magnesium fluoride or barium sulfate may be utilized as the monolith 110 detailed herein. The housing 105 is seamless with an outer body 160 that is capped at each end with an upper 130 and lower 190 end caps that may be threaded, welded or otherwise fusibly secured to the body 160. The body 160 and end caps 130, 190 may be comprised of a suitable material such as stainless steel or titanium, although other durable materials may be utilized to supply adequate hardware for securing the cavity as described herein. Regardless, the interior defined by the outer body 160 and end caps 130, 190 is filled with the fumed silica 110 in a tightly packed monolithic form. As alluded to above and detailed further below, this type of fumed silica 110 may be highly effective as a diffuse reflective for integrating cavity applications such as optical spectroscopy or routine optical photometry and metrology.

Continuing with reference to FIG. 1, to enhance the long-term reliability and effectiveness of the fumed silica 110 as a diffuse reflective, a substantially transparent liner 101 is provided at the inner surface of the monolithic silica 110. In the embodiment shown, an interior flow-through cell or channel 111 is also provided through the device 100, including through the monolith 110 and the cavity 175. Thus, an inlet 120 and outlet 125 may be provided for flowing a sample into and out of the cavity 175 as described further below. The channel 111 may be of the same material as the liner 101 with a 40 thread per inch or other suitable mounting feature where intersecting the end caps 130, 190. In the embodiment shown, the channel 111 includes a central portion 107 through the cavity 175 with a space 179 that is larger in diameter than the inlet 120 and outlet 125. However, in other embodiments, this portion 107 may be avoided with the inlet 120 and outlet 125 meeting in an integral manner with the liner 101 defining the cavity 175 (see FIG. 5).

Among other benefits, the liner 101, or the channel 111 where present, provides a clear durable surface that may be cleaned using common solvents and cleansers without long-term effects to the liner 101 or channel 111 structure. With added reference to FIG. 4, the inner surface of the silica 110 defines the actual cavity 175 of the integrating cavity device 100. A sample 450 for evaluation may be flowed through the cavity 175 for evaluation, with or without the aid of the central portion 107 as described above. Thus, the ability of the silica 110 to serve as a diffuse reflective with respect to the cavity 175 and sample 450 therein is dependent on the transparent nature of the liner 101 and channel 111 materials. In one embodiment, these materials are of a fused quartz, which may be referred to as a "fused silica". In one embodiment, the liner 101 and/or channel 111 are of a clarity that displays negligible effect on light directed from the cavity 175 interior toward the fumed silica 110 or that is diffusely reflected back from the fumed silica 110. Thus, the liner and channel materials may be referred to herein as being "substantially transparent". This term is meant to encompass any degree of substantial translucency, such as where the is intentionally frosted or tailored with a degree of opaqueness or color additive to attain a degree of light filtering for sake of measurement focus.

The noted light of the cavity 175 during an integrating cavity application is provided and diffusely reflected back relative a round, square, rectangular, tapered or hexagonal rod of a light pipe 115. This pipe 115 may be a collimated integrating or homogenizing light pipe constructed of the same fused quartz or other material of the liner 101 and channel 111. The pipe 115 may interface with fiber optics as described below for sake of light delivery and collection relative the cavity 175. The dimensions of the cavity 175 (such as (D) and (d), perhaps 2-4 inches each) are stored such that absorption and other readings acquired from an integrating cavity application as they relate to a given sample 450 may be used to calculate optical characteristics of the sample 450 (e.g. see the system layout 400 of FIG. 4).

The light pipe 115 may enter the upper or primary body 125 via an air-tight seal. Indeed, the interfacing liner 101 may also be air-tight and serve to sealingly define the cavity 175 with respect to the contained fumed silica 110. Given the irregular morphology and potentially structurally delicate nature of the packed fumed silica 110, the liner 101 specifically may also serve a function of mechanical reinforcement to the underlying monolithic silica 110. In one embodiment, the liner 101 is not only air-tight but also placed under vacuum to even further enhance structural integrity and reflectiveness of the silica 110 as described below. Once more, this may serve as an added degree of isolation where high pressures are introduced through the channel 111 or cavity 175 during sample introduction or flowing.

Figure 2A:
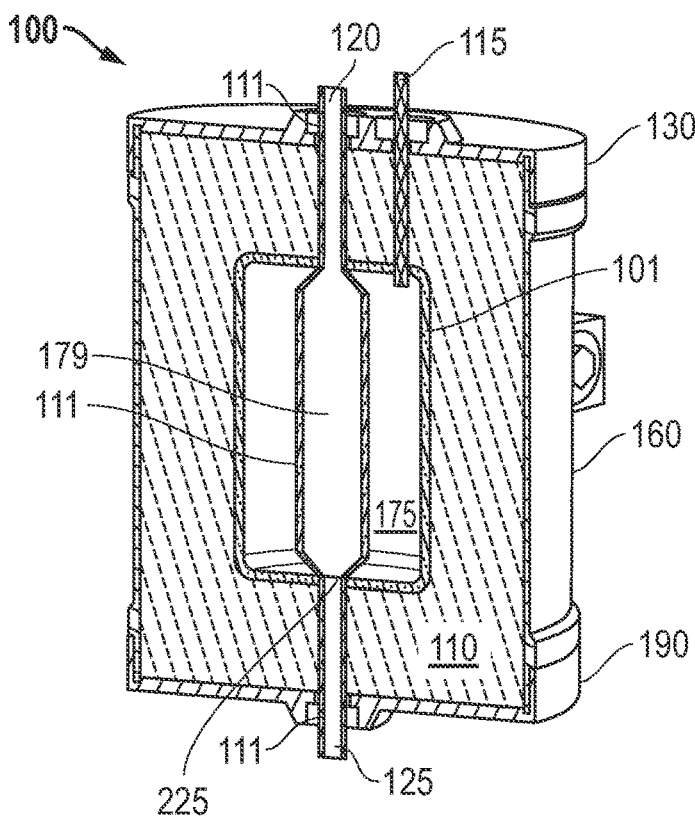
FIG. 2A is a perspective view of the seamless fumed silica integrating cavity device of FIG. 1.

Referring now to FIG. 2A, a perspective view of the seamless fumed silica integrating cavity device 100 of FIG. 1 is illustrated. The overall device 100 is provided in a package form for ease of transport and installation with user friendly mounting hardware provided. It is also apparent that this embodiment is well suited for flowing a sample of a gas, liquid, granular materials or other substance into the inlet 120 and out the outlet 125 with readings taking place over the interim. Of course, a powder or other type of substance may be introduced to the cavity 175 for measurement by way of the channel 111 so long as the specimen type is suitably small enough relative the dimensions of the device 100 and channel 111.

Continuing with reference to FIG. 2A, in one embodiment, the specimen or sample may be supplied to the cavity 175 for measurement in more of a static rather than flowing manner. For example, a valve 225 at the top of the outlet 125 may be closed to allow the specimen to be held in place for optical measurement. Subsequently, the valve 225 may be opened to allow continued flowing of the specimen out of the cavity 175 location. Whether held statically or continuously flowed, the movement of the specimen into and out of the cavity 175 may be aided by suitable pressure or suction in addition to the structure of the channel 111.

In FIG. 2A, the sandwiching of the monolith 110 of fumed silica between the liner 101 and housing structure 160 (and/or 190, 130). This sandwiching of the monolithic fumed silica 110 may help avoid damage due to impact or vibration that might be found in an industrial environment. Therefore, the integrating cavity 100 may be used in a harsher environment or even shipped, by land, sea, air, rocket or whatever the case may be, without undue concern over damage.

Figure 2B:
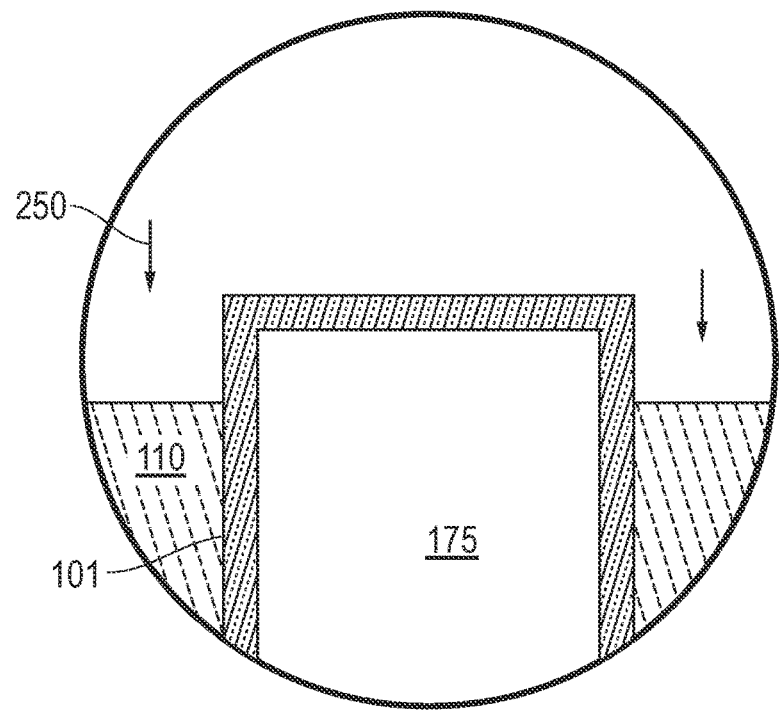
FIG. 2B is a perspective view of an additive technique to form a fumed silica monolith about a fused quartz liner defining a cavity of the device of FIG. 1.

Referring now to FIG. 2B, the monolithic fumed silica 110 may be fabricated as a monolithic structure of packed 20-50 nm particle size fumed silica. Pressurizing and baking of the fumed silica in conjunction with the pressing or packing (see arrows 250), for example, at 800-1,000° C., may be used to eliminate moisture prior to monolithic fabrication by way of an additive process. Thus, as illustrated, the fumed silica 110 may be provided over the lower end cap 190, layer by layer, with repeated pressing or packing 250 in order to form a complete monolith 110 around the liner 101 until complete as illustrated in FIG. 2A with the upper end cap 130 then completing the device 100. For such an embodiment, this means that reductive machining or milling to remove monolithic material may be avoided in forming the cavity. Thus, monolithic material losses of up to 60% for a 10" cavity may be avoided.

For such an embodiment, there would be no internal gaps or seams and each monolith would be environmentally isolated by the indicated sandwiching. Further, as indicated above, the final construct may be under a vacuum seal, for example by a conventional low outgassing adhesive isolating process, ultimately enhancing reflectivity of the monolith 110. Electrostatic forces of the fumed silica particles may act to further hold each monolith 110 together. Ultimately, a diffuse reflective with a reflectivity of over 99.8% in the visible spectral range of 400 nm-700 nm may be attained that is held together in a mechanically resilient and reliable form. Even outside of this range, reflectivity of greater than about 99.5% may extend from about 220 nm to about 1,300 nm for such fumed silica embodiments.

For simplicity of illustrating the additive monolith construction, the light pipe 115 and channel 111 structures of FIGS. 1 and 2A are not shown in FIG. 2B. However, these structures 111, 115 would likely already be incorporated into and/or interfacing with the liner 101 in advance of the illustrated construction of the monolith 110.

Figure 3:
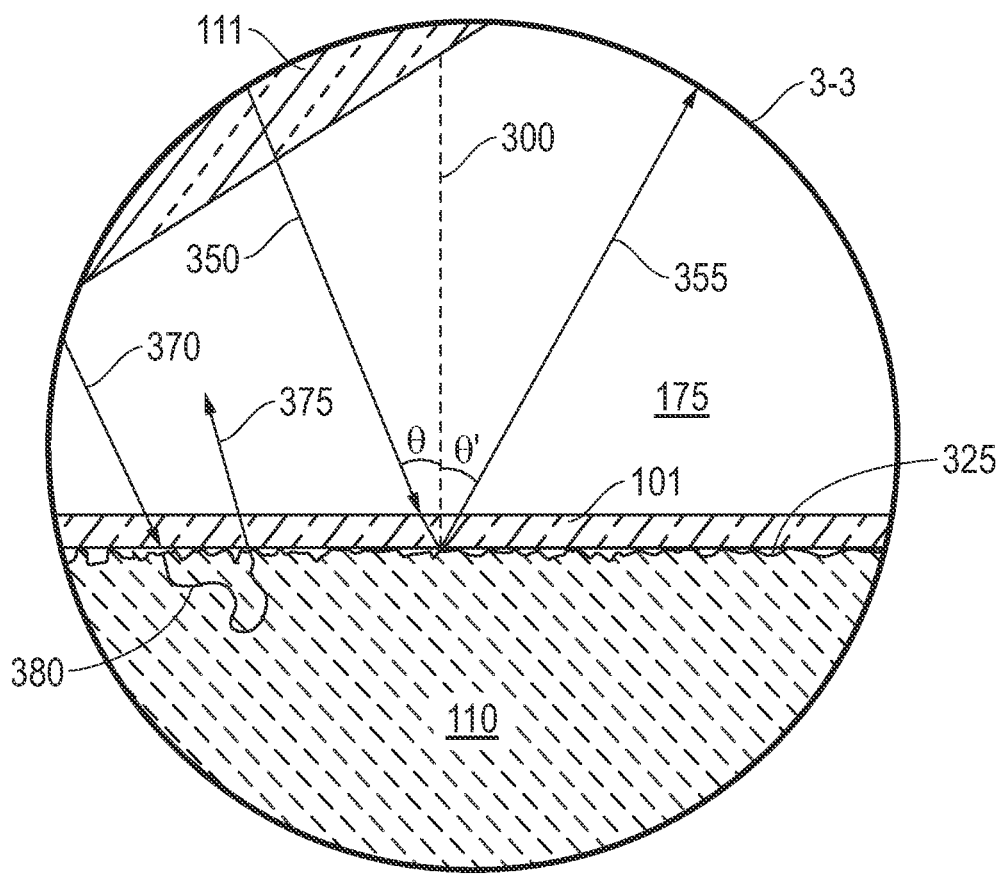
FIG. 3 is an enlarged view taken from 3-3 of FIG. 1 illustrating light behavior during a measurement test run with the integrating cavity device.

Referring now to FIG. 3, an enlarged view taken from 3-3 of FIG. 1 is shown illustrating light behavior during a measurement test run within the device 100. More specifically, this view illustrates the behavior of light (e.g. 350, 355, 370, 375) during a measurement test run with the integrating cavity 100 of FIG. 1. Notice the highly irregular surface 325 of the fumed silica 110. The illustration highlights the irregular morphology of fumed silica particles but is not meant to infer that there would be any notable spaces between the compacted monolithic fumed silica 110 and the depicted liner 102. Rather, the illustration highlights the fact that the diffuse reflective of fumed silica 110 may scatter light 350, 370 in every manner of directions. For example, like a conventional non-diffuse reflective, the fumed silica 110 may receive incident light 350 at one angle θ and reflect it 355 at another roughly equivalent angle θ' (as measured along a perpendicular axis 300 relative the surface 325). This mirroring of the light 350, 355 would be fairly standard for a non-diffuse reflective material. However, the unique nature of the fumed silica 110 is that it is highly diffuse with a substantially irregular surface 325 and morphology throughout. Thus, in other instances, incident light 370 may be received, penetrate the surface 325 by several mm, bounce around in a refracted nature within the material (see 380) and ultimately be reflected 375 at any number of different angles irrespective of the angle of the received incident light 370. That is, while the light 370 may initially seem to be absorbed, it will generally end up reflected 375 but at a random angle having no apparent relation to the angle of the incident light 370.

Continuing with reference to FIG. 3, the refracted bounced around light 380 penetrating the fumed silica 110 is generally ultimately reflected as illustrated. Indeed, the fumed silica 110 may be rated to be over 99.8% reflective as indicated, filling the volume of the cavity 175 with light. Thus, only negligible degree of absorption of the light 370 actually occurs. Further, the randomness with which the light is reflected results in a Lambertian scattering of light displaying a radiance that is the same in all directions which is well suited for integrated cavity applications. For example, a sample 450 that is flowingly directed through the channel 111 may be analyzed in terms of its own differing effect on light and absorption in contrast to the scattered light (see FIG. 4). So, for example, a powder amino acid may be flowed through and subjected to such an application to ascertain its characteristics, purity or even to confirm that the amino acid is the purported amino acid sample. Any number of other substances may be evaluated in much the same way.

Due to the transparent nature of the liner 101 and channel 111 structures, all of this diffuse reflective behavior of the light is substantially unaffected by the structures. Further, these structures 101, 111 provide a more durable interface for the environment that is receptive to cleaning as described above. Therefore, the integrated cavity 100 is not only effective as an optical measurement device, but it may be repeatedly used over time, with measurements of one sample followed by measurements of another, without undue concern over device durability.

Figure 4:
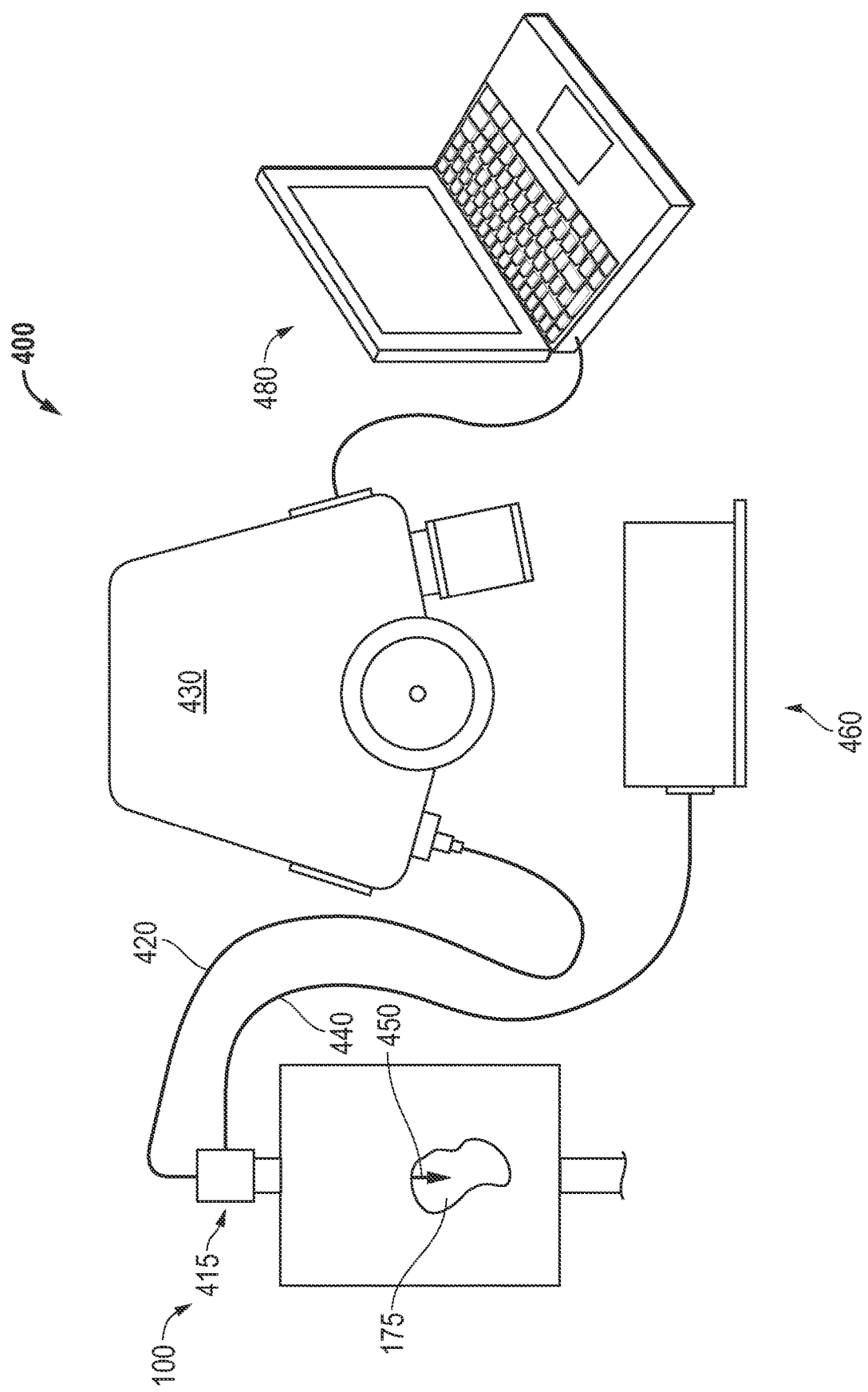
FIG. 4 is a schematic layout of an embodiment of an optical measurement system employing the integrating cavity device of FIG. 1.

Referring now to FIG. 4, a schematic layout of an embodiment of an optical measurement system 400 is illustrated employing the integrating cavity device of FIG. 1. Depending on the application to be run, this may be referred to as an iCAS (integrated cavity absorption spectroscopy), iCRD (integrating cavity ring-down spectroscopy), iCEFS (integrating cavity enhanced fluorescence spectroscopy), iCERS (integrating cavity enhanced Raman spectroscopy) or other application system. The system 400 employs the integrating cavity 100 of FIG. 1 in conjunction with a laser assembly 460 and a spectrometer 430 to deliver light and collect light, respectively for analysis. Of course, any spectral detector may be suitably employed. Further, a conventional laptop 480 is shown communicatively coupled to the spectrometer 430 to serve as an interface for analysis of the collected light data from the spectrometer 430. Ultimately, this may provide optical information regarding the flowing sample 450 to and from the cavity 175.

Continuing with reference to FIG. 1, the laser assembly 460 or other light source may emit light from a diode laser along a laser optical fiber 440 to the integrating cavity 100 via an optical coupling 415 at the light pipe 115 of FIG. 1. In one embodiment, the coupling 415 is a common lens mount thread to support fiber optic connectivity. Regardless, the resultant scattered light as described above may be collected through the collection optical fiber 420 via the same coupling 415 and pipe 115 for routing to the spectrometer 430. Because light uniformly fills the cavity 175, the whole sample surface or volume within the cavity is measured simultaneously providing enhanced sample measurements for analysis. As suggested, the particular application may vary. For example, in one embodiment "ringdown" characteristic time of short light pulses interacting with the sample 450 may be analyzed. Of course, Raman or trace fluorescence measurements may also be analyzed or any number of readings evaluated. These may also include metrology analyses such as radiance, emission spectral energy or even power measurements.

Figure 5:
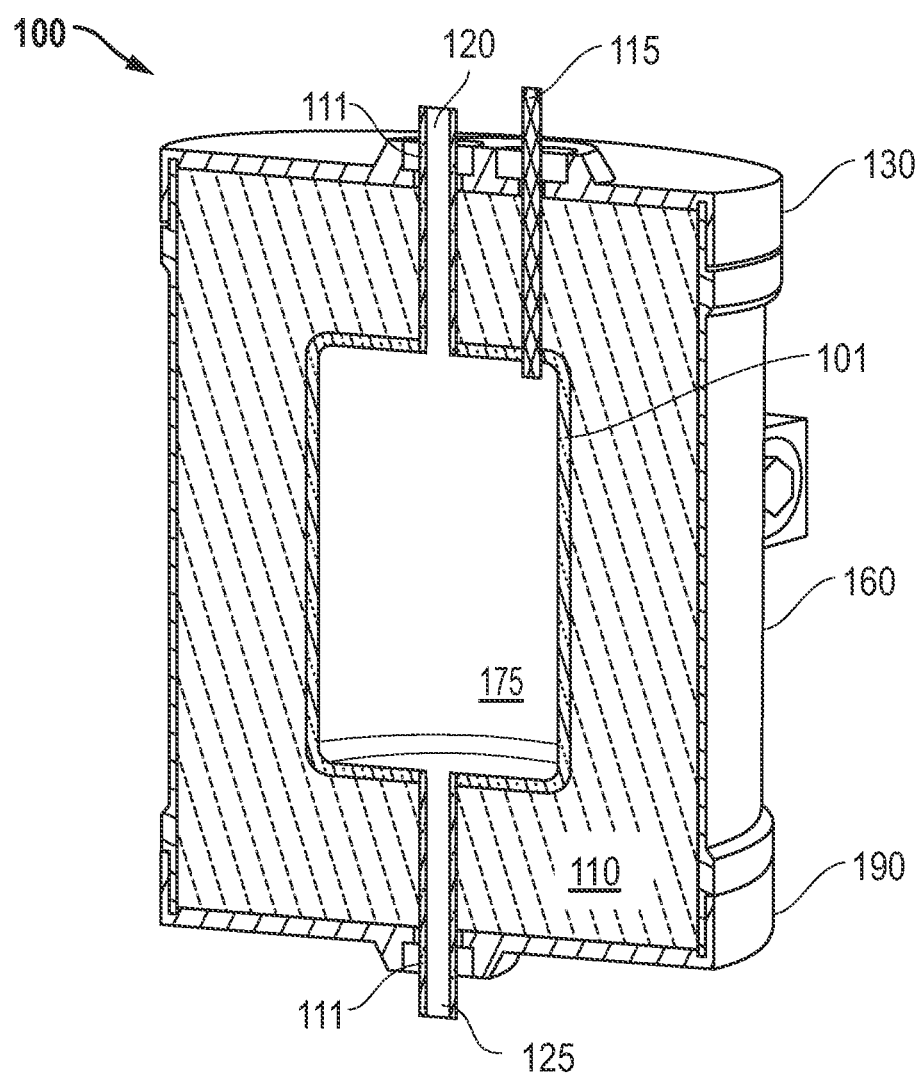
FIG. 5 is a perspective view of an alternate embodiment of a seamless fumed silica integrating cavity device.

Referring now to FIG. 5, a perspective view of an alternate embodiment of a seamless fumed silica integrating cavity device is shown. The overall device 100 is again provided in a package form for ease of transport and installation with user friendly mounting hardware provided. However, in this embodiment, the structure of the channel 111 is limited to the inlet 120 and outlet 125 without the use of any intervening central portion 107 as illustrated in FIG. 1. Rather, the cavity 175 alone, as defined by the liner 101 is sufficient for guiding a sample 450 for measurement as noted in FIG. 4. Indeed, flowing a sample of a gas, liquid, powder, granular materials or other substance into the inlet 120 and out the outlet 125 remains viable. Further, in one embodiment, the inlet 120 may also serve the outlet function without the requirement of a separately dedicated outlet 125 as illustrated.

Figure 6:
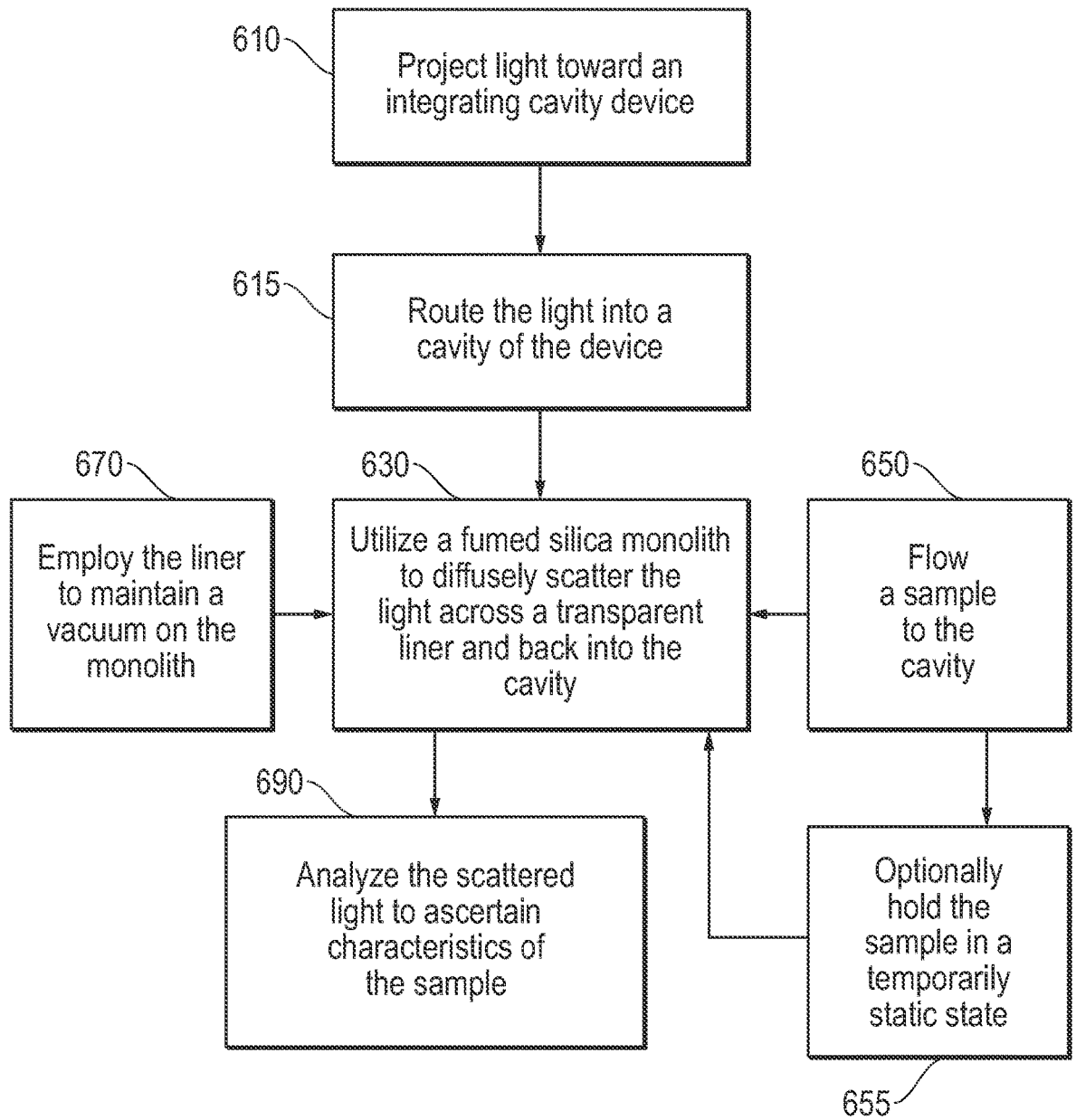
FIG. 6 is a flow-chart summarizing an embodiment of utilizing the system of FIG. 5 to attain optical measurements of a sample within an integrating cavity device.

Referring now to FIG. 6, a flow-chart summarizing an embodiment of utilizing the system of FIG. 4 is illustrated for attaining optical measurements of a sample flowed through an integrating cavity device. Specifically, the system is used to attain optical measurements of a sample that is flowed through an integrating cavity as illustrated in FIG. 1. A light is projected toward the integrating cavity device and routed to a cavity therein as indicated at 610 and 615. A sample is also flowed to the cavity of the device where a fumed silica monolith is used to diffusely scatter the light across a transparent liner that helps define the cavity (see 630, 650). In one embodiment, the sample may be held temporarily in a static state as indicated at 655, such as where a valve of the cavity is momentarily held closed for collection of a powder, granular material or other flowable sample type.

As indicated at 570, the liner may also be employed to maintain a vacuum on the monolith to further ensure its integrity and durability for the application, the application environment and even for transport to the application environment location. Regardless, these maneuvers may ultimately support the analysis of the scattered light to ascertain characteristics of the sample in question (see 690).

Embodiments described hereinabove include seamless fumed monolithic silica integrated cavities. More specifically, these cavity devices include a protective lining at the surface of the fumed silica that is transparent and protective to the underlying fumed silica while simultaneously supporting flowing, dynamic sample analysis. Further, the devices may be cleaned and utilized repeatedly without undue concern over impurities in the cavity or damage to the fumed silica that might render the devices less effective.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the

We claim:

1. A seamless integrating cavity device for incorporation into a system to facilitate optical measurements of a sample, the system including a light source and a spectral detector and the device comprising:
    an outer housing accommodating a light pipe for the light source and an inlet for receiving of the sample;
    a central cavity defined by a liner of fused quartz to receive the sample from the inlet and light from the light pipe; and
    a diffusely reflective monolithic reflective sandwiched between the outer housing and the liner of fused quartz and in air-tight sealing communication therewith.

2. The seamless integrating cavity device of claim 1 wherein the air-tight sealing communication of the liner to the monolithic reflective is under vacuum pressure relative the underlying reflective.

3. The seamless integrating cavity device of claim 1 wherein the monolithic reflective is of a material selected from a group consisting of fumed silica, magnesium fluoride and barium sulfate.

4. The seamless integrating cavity device of claim 1 wherein the reflective is one of greater than about 99.8% reflective over a spectrum of between about 400 nm and about 700 nm and greater than about 99.5% reflective over a spectrum of between about 220 nm and about 1,300 nm.

5. The seamless integrating cavity device of claim 1 wherein the sample is fluidly received by the cavity, the device further comprising an outlet at the outer housing for flowing the sample from the cavity out of the device following the optical measurements, the outlet comprised of one of the inlet and a separate dedicated outlet.

6. The seamless integrating cavity device of claim 5 wherein the inlet and the outlet are comprised of a fused quartz material.

7. The seamless integrating cavity device of claim 5 further comprising a channel defined by the inlet, the cavity and the outlet.

8. The seamless integrating cavity device of claim 5 further comprising a channel defined by the inlet, a central portion through the cavity and the outlet.

9. The seamless integrating cavity device of claim 5 further comprising a valve at the outlet to temporarily impede the sample for the measurements.

* * * * *